United States Patent [19]

Griego et al.

[11] Patent Number: 4,538,905
[45] Date of Patent: Sep. 3, 1985

[54] ELECTRONIC IMAGE REGISTRATION

[75] Inventors: Deborah B. Griego, Boulder; Joe M. Hopping, Longmont; Teddy A. Rehage, Longmont; John H. Rhodes, Jr., Longmont, all of Colo.

[73] Assignee: International Business Machines Corporation, Armonk, N.Y.

[21] Appl. No.: 558,232

[22] Filed: Dec. 5, 1983

[51] Int. Cl.³ .............................................. G03G 15/00
[52] U.S. Cl. ............................ 355/14 SH; 355/3 SH; 355/77; 101/DIG. 13
[58] Field of Search ............... 355/14 SH, 3 SR, 3 R, 355/14 R, 14 C, 77; 101/DIG. 13

[56] References Cited

U.S. PATENT DOCUMENTS

| | | | |
|---|---|---|---|
| 3,818,493 | 6/1974 | Slack | 346/74 |
| 3,888,579 | 6/1975 | Rodek et al. | 355/14 |
| 4,026,647 | 5/1977 | Kanno et al. | 355/8 |
| 4,129,377 | 12/1978 | Miyamoto et al. | 355/14 |
| 4,187,024 | 2/1980 | Satomi et al. | 355/3 SH |
| 4,310,236 | 1/1982 | Connin | 355/14 |
| 4,348,101 | 9/1982 | Schonfeld et al. | 355/14 |
| 4,422,751 | 12/1983 | Komiya et al. | 355/3 SH |

Primary Examiner—R. L. Moses
Attorney, Agent, or Firm—Charles E. Rohrer

[57] ABSTRACT

An electrophotographic printing machine utilizing a scanning light beam to produce generated characters is disclosed. The start of character generation is controlled by the edge position of paper receiving the image. Edge position of the paper is sensed prior to entry of the paper into the print receiving station. Signal(s) representing the edge position are sent to data processing control means. The signals are converted into an appropriate shift factor for controlling the start of pel generation. In that manner, the image to be generated is shifted in accordance with paper position so that proper margins are maintained regardless of paper position.

10 Claims, 9 Drawing Figures

| TRANSLATE TABLE | |
|---|---|
| SENSOR DATA | BUFFER DATA |
| 0000 0000 | 0000 0000 |
| 0000 0001 | 0000 0001 |
| 0000 0011 | 0000 0010 |
| 0000 0111 | 0000 0011 |
| 0000 1111 | 0000 0100 |
| 0001 1111 | 0000 0101 |
| 0011 1111 | 0000 0110 |
| 0111 1111 | 0000 0111 |
| 1111 1111 | 0000 1000 |

ELECTRONIC IMAGE REGISTRATION

This invention relates to electrophotographic printing machines and more particularly to method and means for sensing the position of image receiving material and adjusting the position of the image on the electrophotographic medium such that the image and the image receiving material are in proper alignment.

BACKGROUND OF THE INVENTION

In electrophotographic printing machines, an image is produced on a photoreceptive surface through the operation of a character generator. The character generator may be, for example, a light source which is driven from information held in a digital memory. The light source may be a laser gun, an array of light emitting diodes, light modulators, etc. which produce light rays which are directed to the photoreceptor and cause it to bear a charge pattern which is an image of the information used to drive the character generator. Generally, the light source is caused to scan the photoreceptor over successive scan lines until an entire image is produced. The image is developed and fused to print (image) receiving material.

In machines which utilize plain bond image receiving material or other ordinary material not specially coated, the electrophotographic process is of the transfer type where photoreceptive material is placed around a rotating drum or arranged as a belt to be driven by a system of rollers. In the typical transfer process, photoreceptive material is passed under a stationary charge generating station to place a relatively uniform electrostatic charge, usually several hundred volts, across the entirety of the photoreceptive surface. The photoreceptive surface is moved to an imaging station where it receives light rays to produce the desired image. In the production of a positive image, the photoreceptive material is discharged to a relatively low level in white areas while dark areas continue to contain high voltage levels. In that manner, the photoreceptive material is caused to bear a charge pattern which corresponds to the printing, shading, etc. desired to be reproduced. In the production of a negative image, discharge occurs in the dark portions.

After producing an image on the photoreceptor, the image is sent to a developing station where developing material called toner is placed on the image. This material may be in the form of a lack powder or liquid which carries a charge opposite in polarity to the charge pattern on the photoreceptor in a system which produces a positive image. In a negative image system, the toner would carry the same polarity as the charge on the photoconductor. Because of the attraction of the charged toner, it adheres to the surface of the photoreceptor in proportions related to the shading of the image. Thus, black character printing should receive heavy toner deposits, white background areas should receive none and gray or otherwise shaded half-tone character portions should receive intermediate amounts.

The developed image is moved from the developer to a transfer station where image receiving material, usually paper, is juxtaposed to the developed image on the photoreceptor. A charge is placed on the back side of the paper so that when the paper is stripped from the photoreceptor, the toner material is held on the paper and removed from the photoreceptor. The remaining process steps call for permanently bonding the transferred toner material to the paper and cleaning residual toner left on the photoreceptor after the transfer operation. Thereafter, the photoconductor is reused for subsequent print production.

A common variation on the above-described process used in many electrophotographic machines involves the use of specially prepared material where the material itself carries a coating of photosensitive material. By utilizing that technique, the image is electrostatically placed directly on the image receiving paper. The paper is sent through a developer and then to a fuser for permanent bonding. Machines of this type avoid the residual toner problem and therefore avoid the need for cleaning stations. However, the resulting paper with its special photosensitive coating is more expensive than plain bond paper and special coating is considered to detract from the resulting product. As a consequence, coated paper machines are usually favored only for low volume applications or where quality product is not essential.

Regardless of whether a transfer process is used or whether specially coated paper is used, prior art machines have found it necessary to provide accurate paper placement in order that the image is placed on the paper at the proper position. In most machines, this has meant the provision of reference edges against which the paper is driven so that the side edge of the print receiving material is in a known, consistently-maintained position. Mechanical gates or gating rollers are frequently used to position the leading edge of the paper so that it mates with the leading edge of the image at a proper time. These prior art techniques have generally worked well but are the source of paper jams from time to time. One can appreciate that if the side edge of a paper must slip along a side reference edge without climbing over that edge and without moving away from that edge, a constraint is placed upon the paper feeding devices which occasionally results in malfunction. The inventors herein have devised a mechanism and a method for obtaining a proper image and image receiving material relationship without using side reference edges and thereby avoiding the jams which occasionally result therefrom. Additionally, by providing a proper image to paper relationship without reference edges, the speed at which the image receiving material can be moved to the image receiving position can be increased.

SUMMARY OF THE INVENTION

Briefly stated, this invention is directed toward means and method for adjusting the position of an image such that the image mates properly with the position of image receiving material.

In the practice of this invention, a sensing unit is provided such that the position of the side edge of image receiving material is sensed. That information is provided to data processing equipment which in turn adjusts the position of the image on the photoreceptor so that a proper relationship between the image and the image receiving material is provided. Proper positioning of the image is accomplished by changing the start of scan position at which light rays are directed toward the photoconductor by the character generating printhead.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

FIG. 7, comprised of FIGS. 7A, 7B, and 7C are flowcharts and tables illustrating a typical data processing embodiment for adjusting the position of the image to match the information received from the sensing unit.

DETAILED DESCRIPTION

Figure 1:
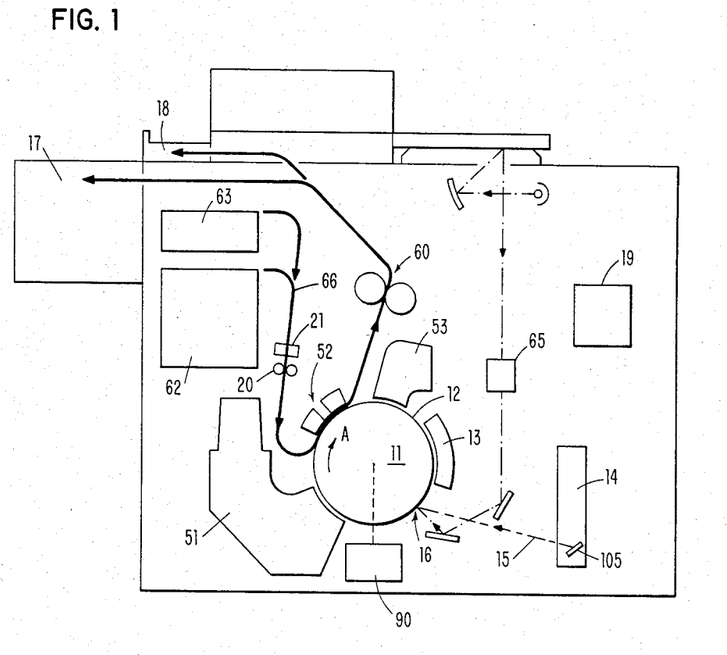
FIG. 1 is a general layout of a typical electrophotographic printing machine.

An electrophotographic machine capable of using the instant invention is shown in FIG. 1. A drum 11 carries upon its surface photoreceptive material 12 which is charged by charge corona 13 to a relatively uniform voltage as drum 11 rotates in direction A. The optical system, shown as module 14, generates light rays 15 which strike the moving photoreceptive surface at exposure station 16. The latent image produced at exposure station 16 is developed by developer 51 and a transfer is made at transfer station 52 to image receiving material. Development material continuing to reside on the surface of photoreceptor 12 after transfer is cleaned away at cleaning station 53. Drum rotation continues for the production of additional prints.

After transfer of the image to the receiving material at transfer station 52, that material is passed through fuser rolls 60 at which the developing material is permanently bonded to the receiving material to produce a print. The print is ultimately deposited at a finishing station 17 or in an exit pocket 18. Other machine elements shown in FIG. 1 include drive motor 90, print material supply bins 62 and 63, path 66 along which print receiving material is moved, feeding rolls 20 for moving material along the path, and a sensing unit 21 to be described in detail later herein. Also shown is an optical system 65 for imaging an original document when the machine is used as a copier machine instead of as a printer.

Figure 2:
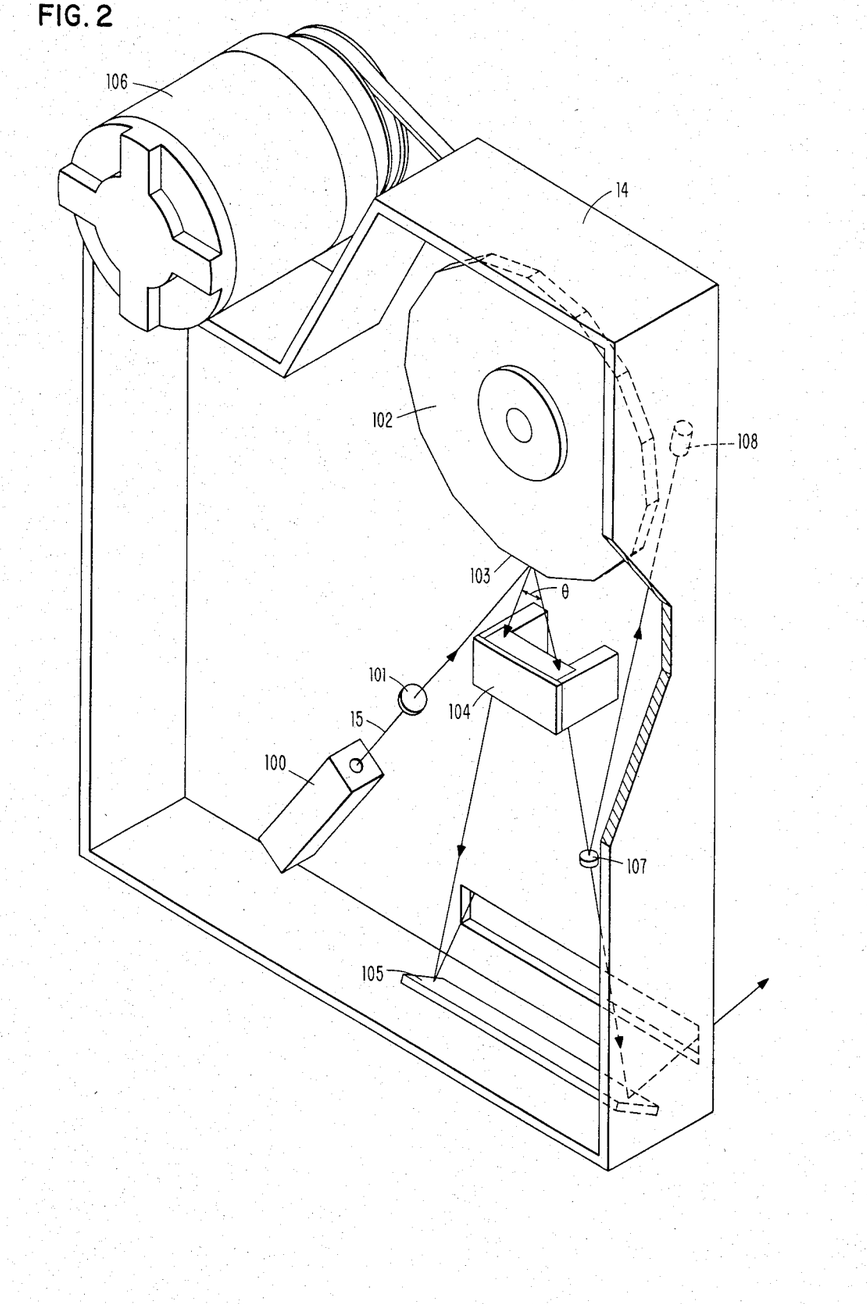
FIG. 2 shows a laser printhead for use in the machine of FIG. 1.

Optical system module 14 is shown in detail in FIG. 2 where a solid-state laser producing chip and a collimating lens are housed in assembly 100. Laser beam 15 passes from assembly 100 through cylindrical lens 101 to a rotating mirror 102 which is produced with a plurality of facets, such as facet 103, around the periphery of the mirror. The laser beam is reflected from a single facet, such as facet 103, in such a manner as to scan through an angle θ. As each succeeding facet of rotating mirror 102 rotates into position to receive beam 15, another scan through the angle θ is produced. Upon reflection from the rotating mirror facet, the laser beam is passed through assembly 104 at which a toroidal lens and a spherical lens are used to finally shape the beam and to focus it upon the photoreceptive surface 12 shown in FIG. 1. It may be noted that assembly 104 could also be composed of a combination of a cylindrical and spherical lens if desired. A beam-fold mirror 105 is shown in both FIGS. 1 and 2 illustrating the final folding mechanism to direct the laser beam to the photoreceptive surface. Motor 106 is provided to drive the rotating mirror 102 while a start-of-scan mirror 107 is provided to direct the laser beam to a start-of-scan detector 108.

Figure 3:
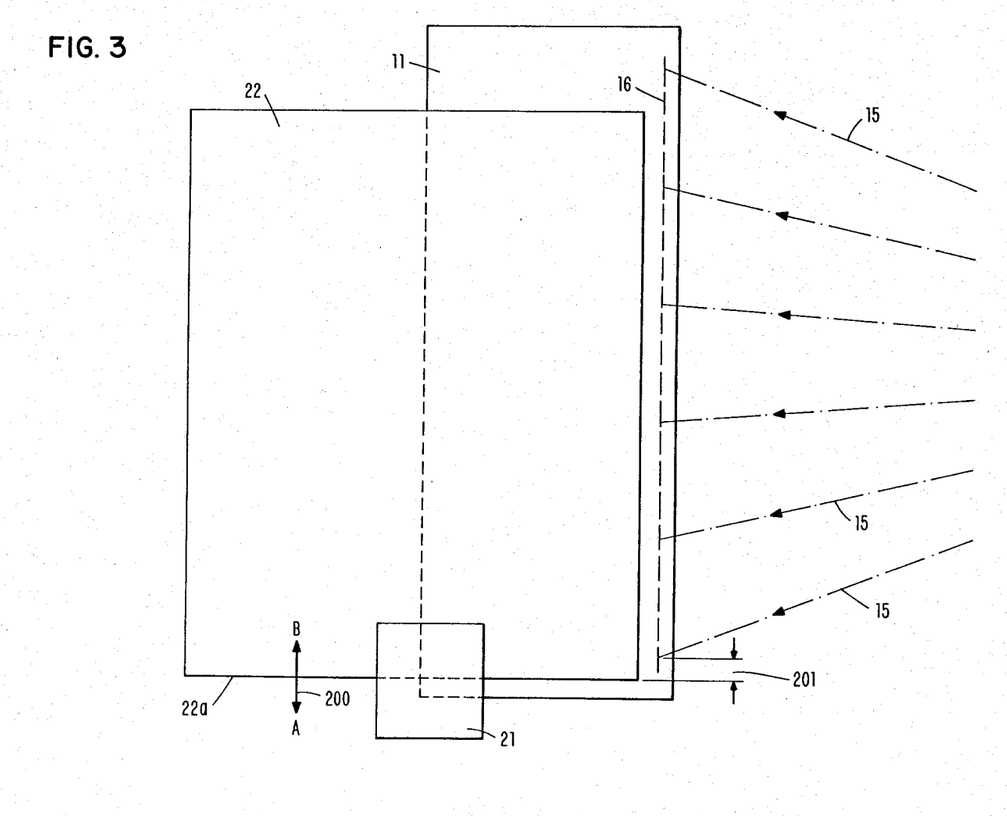
FIG. 3 shows the relationship of light rays generated by the printhead of FIG. 2 impinging on the photoreceptive drum of the machine of FIG. 1 together with the position of image receiving material and a sensing unit to sense the side edge thereof.

FIG. 3 shows the relationship of paper 22, the photoreceptive drum 11 and the light rays 15 which strike the photoreceptor 11 at exposure station 16. Since the paper 22 is not referenced to a side reference edge in the practice of the instant invention, the side edge 22A is not necessarily always at the same position as indicated by the doubled headed arrow 200. As a result, the margin 201 between the edge 22A and the beginning of print characters may vary. In order to maintain the proper margin 201, a sensing unit 21 is provided to sense the exact position of edge 22A. Information as to the position of edge 22A is provided to the data processing unit which then causes the printhead to shift its start of scan so that the light rays 15 strike the photoreceptor at exposure station 16 in a manner such as to maintain the proper margin 201.

Figure 4:
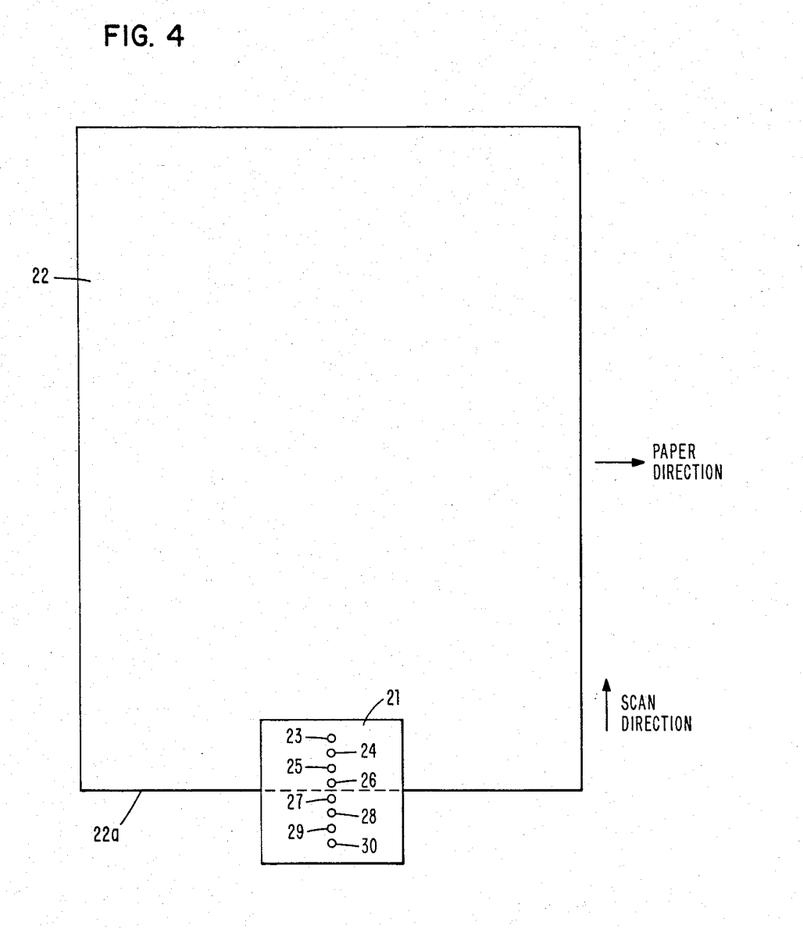
FIG. 4 shows the relationship of an eight sensor unit positioned relative to a sheet of image receiving paper.

FIG. 4 illustrates sensors in the sensing unit 21 to provide information relating to the exact position of paper edge 22A. Note that in the position shown, sensors 23, 24, 25, and 26 are covered by the paper 22 while sensors 27, 28, 29, and 30 are not covered. In that manner, the sensing unit 21 provides the information that the edge 22A is positioned between sensors 26 and 27. By providing a relationship of only a few millimeters between each sensor 23-30, the edge of the paper 22A is then located to within at least a few millimeters. By properly arranging the components of the sensor system, higher resolution can be achieved as explained below with reference to FIG. 6.

Figure 5:
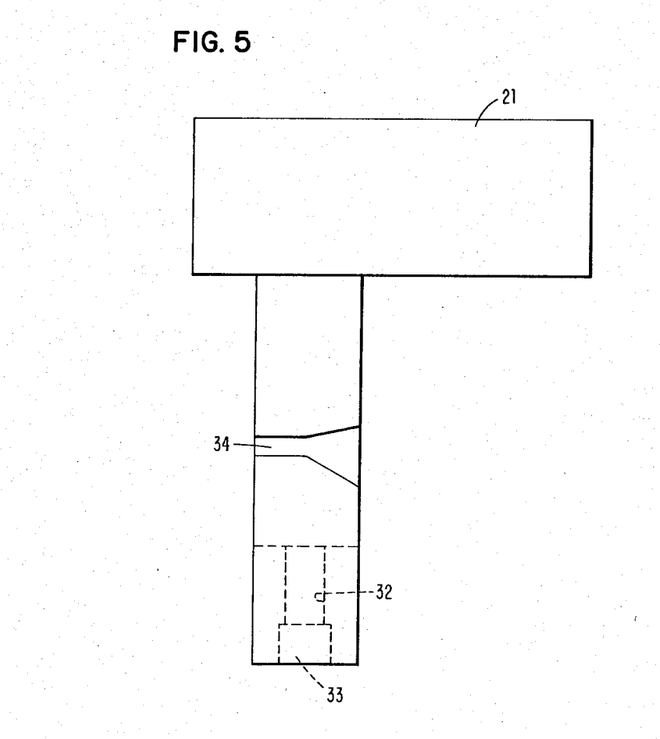
FIG. 5 is a side view of a particular sensing unit.
Figure 6:
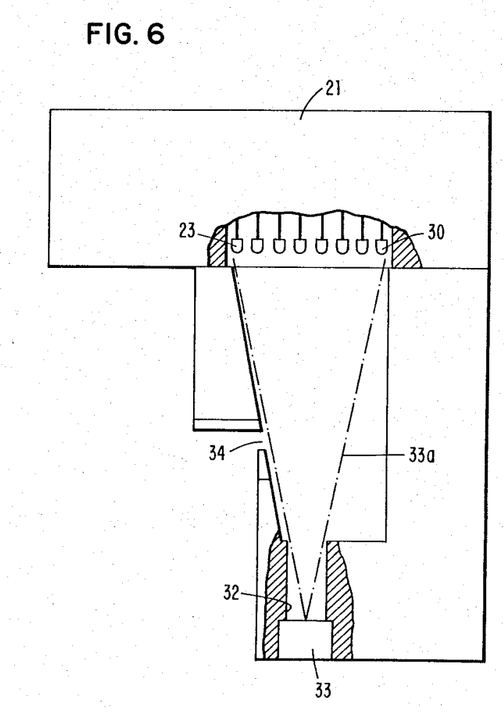
FIG. 6 is a front view of the sensing unit of FIG. 5.

FIGS. 5 and 6 show a side view and a front view, respectively, of sensing unit 21. A light source 33 is positioned in opening 32 such that light passes through chute 34 on its way to the sensors 23-30. The sensing unit 21 is positioned adjacent the paper path such that the side edge 22A, not shown, of paper 22 passes through chute 34 in a manner which will intercept light from the light source passing through chute 34. Thus, by positioning the sensing unit shown in FIGS. 5 and 6 adjacent the edge of a paper path, the side edge 22A of paper 22 may be accurately sensed according to the technique shown in FIG. 4. Note that the relative position of the light source, chute and sensors create a higher resolution than the physical spacing of the sensors through the focusing effect which provides a narrower envelope of light at the chute than at the sensors. Information from the sensing unit 21 is provided to the control unit 19 (FIG. 1) which in turn controls the optical unit 14 to provide the needed changes in the position of light rays 15 to maintain the margin 201. Flowcharts of the control exercised in control unit 19 to perform this operation are shown in FIGS. 7A and 7B.

Figure 7A:
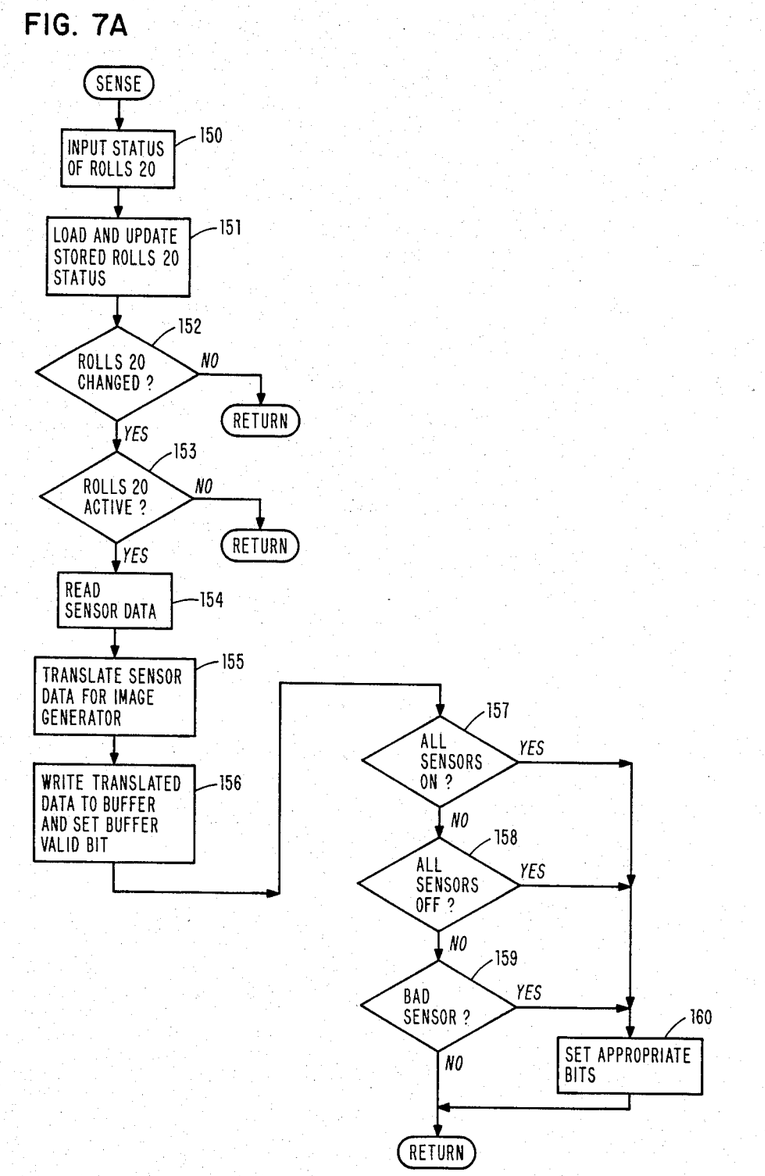
Figure 7B:
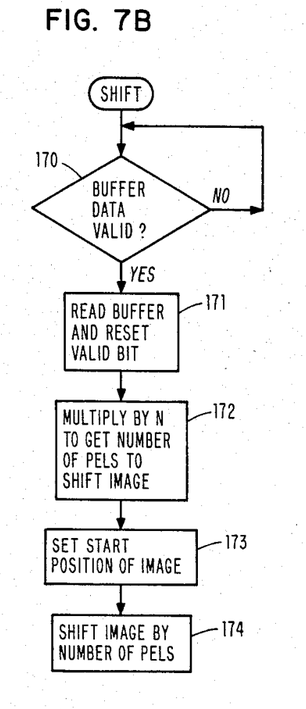
Figure 7C:
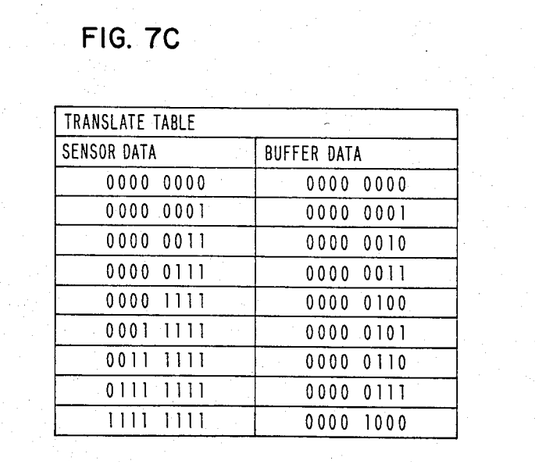

Control unit 19 contains a microprocessor which periodically enters the Sense routine shown in FIG. 7A. Upon entry, step 150 is performed to check the input status of paper feed rolls 20. That status is loaded and the updated information stored at step 151. Should there be no change in the status of rolls 20 as determined at decision step 152, the Sense program is exited and return is made to the microprocessor control program. However, if step 152 indicates that the status of rolls 20 has changed, step 153 is performed to determine whether rolls 20 are now active. If the indication is that rolls 20 are now inactive, the Sense routine is exited and return is made to the control program of the microprocessor. However, if the result of decision step 153 is to determine that the rolls 20 have become active, input step 154 is performed to read the data provided by sensors 23-30. That data is then translated at step 155 to produce buffer data as shown in FIG. 7C for presentation to the image generator. Next, at step 156 an output step is performed to write the translated data to the buffer and set the valid bit showing that the buffer contains data for use by the image generator.

Before returning control to the microprocessor control program, the Sense routine performs three check operations at steps 157, 158, and 159 to determine that the data which has been sensed and stored in steps 154-156 is reliable. To do this, at step 157 the query is asked whether all sensors 23-30 were on. If so, it indicates that the paper 22 is displaced so far to the left (FIG. 4) that all sensors were left uncovered. As a consequence, the exact position of edge 22A cannot be ascertained by the sensors and therefore the information which has been stored in the buffer is not reliable. In such case, a branch is taken at step 157 to step 160 where an appropriate error bit is set to indicate the error condition.

At step 158, the query is made as to whether all sensors are off. If so, paper 22 is displaced so far to the right (FIG. 4) that all of the sensors 23-30 are covered and therefore the exact position of edge 22A cannot be determined. In such case, the data which has been placed into the buffer is unreliable and a branch is taken at step 158 to step 160 for setting the appropriate bit to indicate the error condition.

At step 159, the query is made as to whether a bad sensor is present so as to indicate that the positioning of paper 22 cannot be ascertained and again that the data in the buffer is unreliable. For instance, referring to FIG. 4, suppose that sensor 29 has burned out. In such case, the paper 22 covers sensors 23-26 showing them as off. Sensors 27 and 28 would be on, the bad sensor 29 would be off and sensor 30 would be on. In such an instance, the presence of the bad sensor is detected and a branch is taken at step 159 to set the appropriate bit at step 160. After the performance of these three check functions, return is made to the control program of the microprocessor. If an error was indicated, it may be logged or other appropriate action taken. Presuming that the checks made during steps 157-159 have produced no indication of faulty data, the control program of the character generator enters the Shift routine shown in FIG. 7B. At step 170, a query is made of the buffer valid bit and if it has been set properly at step 156 and not altered during the check steps 157-159, the Shift routine performs step 171. At step 171, the buffer is read to determine the position of the edge 22A. That data is then multiplied by an appropriate number to obtain the number of pels which the image must be shifted in order to provide the appropriate margin 201. The number used will be determined by the number of pels per inch the particular machine is capable of printing and the spacing between sensors. Note that the term "pel" means picture element and is basically a small area or dot produced by the laser beam on the photoconductor in accordance with digitized pel information. The pel forms a part of the character being printed. After determining the number of pels by which the image must be shifted at step 172, the actual starting position of character generation is determined by steps 173 and 174. At step 173, the start position for character generation is set to nominal and at step 174 that position is shifted by the number of pels calculated at step 172.

Referring again to FIG. 2, it should be noted that the calculations made in FIG. 7B result in beginning the image generation at a point slightly removed in time from the nominal (in the event that step 172 produced a shift number). For example, by delaying the start of character generation a slight amount from nominal (by inserting additional white pels), the rotating mirror 102 will have rotated slightly further and consequently the reflection of image bearing data from facet 103 will be slightly removed in time from nominal. In that manner, the envelope of light rays 15 bearing character data is shifted in the direction B (FIG. 3) thus maintaining the margin 201 for the case where the edge 22A is at a position in the direction B from nominal. Another technique is to delay the start of margin generation the required amount.

Similarly, by altering the time forward at which light rays 15 begin to carry character data (by reducing the number of white pels), rotating mirror 102 would not have traveled quite as far at the starting point and light rays reflected from facet 103 will thus be moved in direction A (FIG. 3). In that manner, the margin 201 can be maintained when the edge 22A is at a position in direction A from nominal. Again, another technique is to begin margin generation sooner than nominal.

FIG. 7C shows a translate table for providing sensed data to character generator control. The column headed "Sensor Data" shows eight conditions for the sense unit 21 illustrated in FIG. 4. In that column, a "0" indicates that the sensor is off and a "1" indicates that it is on. The column headed "Buffer Data" translates the sensor data for use by the character generator control. For example, when two sensors are on, the sensor data shows in the table as a digital numeric "3". The translate table provides a digital signal "2" for this condition. In that manner, the number of sensors "on" is provided to the character generator control Shift routine.

While the invention herein has been described in terms of a particular embodiment in which plain copy paper is used and the image is placed on a rotating photoreceptive drum, it should be understood that this invention can also be used with machines which utilize photosensitive paper and in which the image is produced directly on the paper itself. For example, referring to FIG. 3, if one removes the drum 11 from the diagram, it is apparent that the margin 201 can be maintained since the exposure station 16 would be directly on the photosensitive paper itself.

Additionally, it should be understood that the sensing unit 21 can be placed in a duplex portion of the paper path if desired and in some configurations that may be the only part of the paper path which is of interest. For example, in machines with a very short paper path from an input bin to an output bin, there may be no need to sense the side edge of the sheet during simplex production since the sheet would reach the transfer station very quickly after leaving the input bin. In such a machine, when that print paper is brought back to the transfer station for a duplex operation, the distance is much greater and hence the value of the invention would be found in sensing the side edge of the print receiving paper during a duplex operation.

It should also be noted that the nominal position of edge 22A can be ascertained during machine setup and may not be between sensors 26 and 27 as shown in FIG. 4. The exact zero position, or nominal position, of sheet 22 can be found by running a test master and ascertaining where edge 22A provides the nominal. That information can be keyed into the machine through the control panel in order to set the zero position. Also, if zero changes during machine use, the zero position can be adjusted in a similar manner. While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for controlling a printing machine to maintain a desired margin on sheets of print receiving material despite variations from sheet to sheet in the side edge position of said print receiving material, comprising the steps of:
   feeding a sheet of said print receiving material from a supply area to a processing station whereat said printing machine places print on said material;
   sensing the position of the side edge of said sheet of print receiving material prior to its entry into said processing station;
   deriving a factor indicative of the sensed position; and
   controlling the placement of said print in accordance with the derived factor so that a desired margin can be maintained on said print receiving material.

2. The method of claim 1 wherein said feeding and sensing steps include the feeding of said print receiving material forwardly along a path so that the side edge of said material is located within the boundaries of sensing proximity of a sensing mechanism placed along the side of said path, said sensing mechanism providing a plurality of separate sense elements extending in a direction from the edge of said path inwardly into said path so that the presence of said material is sensed by the operation of at least that separate sense element located at the innermost path position, the number of operated sense elements extending from said innermost sense element outwardly toward the edge of said path, the number of separate sense elements operated by said presence depending upon the location of the side edge of said material in said path.

3. The method of claim 2 wherein said deriving step includes the reception of signals from said sensing mechanism, said signals indicating which of those separate sensors have been operated by the presence of said material and further including the steps of:
   processing the received signals to derive a digital representation thereof;
   translating said digital representation into said factor indicative of the position of said material; and
   presenting said factor to the control elements of a print generation device to control the placement of print accordingly.

4. Apparatus for shifting the side edge of an image to be generated at a processing station by an electrophotographic printing machine in accordance with the variable position of the side edge of image receiving material in order to maintain proper print margin, comprising:
   feeding means for serially feeding sheets of image receiving material along a path to said processing station;
   sensing means located along the side edge of said path for sensing the side edge position of said material and for producing signals indicative thereof; and
   data processing means for receiving said signals and for producing a shift factor therefrom, said shift factor representing the number of picture elements (pels) by which said image must be shifted to maintain a proper margin consonant with the sensed position of the side edge.

5. The apparatus of claim 4 wherein said sensing means further includes:
   a plurality of separate sense elements extending in a direction from the edge of said path into said path for sensing the presence of said material.

6. The apparatus of claim 5 wherein said separate sense elements are spaced one from another inwardly into said path to provide a matrix of signals providing for high resolution in ascertaining edge position.

7. The apparatus of claim 5 wherein said data processing means includes means for translating said received signals into a binary representation of the number of separate sense elements activated by the presence of said material and for acting thereon to produce said shift factor.

8. An electrophotographic printing machine comprising:
   a processing station including photoreceptive material for receiving an image;
   an optical system including light source means for generating said image;
   supply means for holding sheets of image receiving material;
   means for defining a path between said supply means and said processing station;
   feeding means for serially forwarding individual image receiving sheets from said supply means along said path to said processing station;
   sensing means located along said path adjacent an edge thereof for sensing the position of an edge of a sheet of image receiving material as it moves therealong and for producing signals indicative of said position; and
   control means for receiving said signals and for generating a shift factor therefrom, said control means also including means for controlling said optical system to alter the generation of character producing pels in accordance with said shift factor;
   whereby the position of said image is shifted in accordance with the position of said material so that desired margins are maintained between said image and the edge of said material.

9. The apparatus of claim 8 wherein said optical system includes a light source for producing a light beam and a moving mirror, said light beam being directed upon said mirror and reflected therefrom to scan through a desired scan angle, said light source controlled by said control means to present character information during said scan, said control means using said shift factor to alter the start of the generation of character producing pels to maintain said margin.

10. The apparatus of claim 9 wherein said mirror contains many facets and is mounted for rotation, whereby said light beam is directed upon said facets and reflected therefrom.

* * * * *